United States Patent

[11] 3,600,604

[72] Inventor George M. Thorne-Booth
Murrysville, Pa.
[21] Appl. No. 780,662
[22] Filed Dec. 3, 1968
[45] Patented Aug. 17, 1971
[73] Assignee Westinghouse Electric Corporation
Pittsburgh, Pa.

[54] FAILSAFE LOGIC GATES
15 Claims, 10 Drawing Figs.

[52] U.S. Cl. 307/218, 307/253, 328/94, 317/33
[51] Int. Cl. H03k 19/22
[50] Field of Search 328/94; 307/253, 218; 317/33

[56] References Cited

UNITED STATES PATENTS

| | | | |
|---|---|---|---|
| 2,519,763 | 8/1950 | Hoglund | 328/94 |
| 2,649,543 | 8/1953 | Trachtenberg | 328/94 |
| 2,752,530 | 6/1956 | Aigrain | 328/94 |
| 2,946,957 | 7/1960 | Beter et al. | 307/253 |
| 2,987,627 | 6/1961 | Eckert | 307/253 |
| 3,005,160 | 10/1961 | Newberry et al. | 328/94 |
| 3,062,973 | 11/1962 | Shea | 307/218 |
| 3,421,018 | 1/1969 | Martin | 328/94 |
| 3,430,066 | 2/1969 | Marsh et al. | 307/218 |

*Primary Examiner*—Donald D. Forrer
*Assistant Examiner*—Harold A. Dixon
*Attorneys*—F. H. Henson, R. G. Brodahl and M. F. Oglo

ABSTRACT: A novel electronic switching circuit is operated as an AC enable gate circuit which is adaptable to perform diverse functions in which failsafeness is desired. These functions include logic gating in binary data signal systems and interlocking relay functions in safety monitoring systems. The switching circuit construction yields an enable gate circuit operation mode which relies upon two dynamic signals to thereby provide virtually total failsafeness. The gate switching is performed by actuating an active amplifying device between its ENERGIZED and DEENERGIZED states to provide the OPEN and CLOSED enable gate circuit conditions, respectively. A gate actuation signal input network of the circuit derives the device energizing signal in response to a dynamic actuation signal, which is one of the dynamic signals relied upon for failsafe properties. The enable gate channel of the circuit is of a construction which passes only a dynamic, or AC carrier signal above a predetermined threshold. The carrier signal is the other of the dynamic signals relied upon for failsafe properties. The AC carrier is amplified and then attenuated in its passage through the enable gate channel to cooperate with a thresholding in other circuits which may be connected in cascade.

INVENTOR
George M. Thorne-Booth
BY Michael F. Oglo
ATTORNEY

FAILSAFE LOGIC GATES

CROSS REFERENCE TO RELATED APPLICATIONS

None

BACKGROUND OF THE INVENTION

This invention relates to a scheme of electronic switching which yields desired properties of so-called "fail-safeness." Among the particular types of signal systems to which the scheme is applicable are: Binary data signal systems where the signal formal has predetermined inherent dynamic properties; safety interlocking systems to tone signals; and the interlocking of the gating of a plurality of signal channels to presence of monitored signal in accordance with desired safety logic functions.

There is a trend toward introduction of larger degrees of automation into the field of railway urban rapid transit systems, and at the same time a trend toward higher speeds and shorter headways between trains. An example of this is the San Francisco Bay Area Rapid Transit System where movement of traffic is predominantly under automation control with trains attaining speeds of 80 miles per hour (m.p.h.) with only 90 second headways. The system further involves interconnecting routes having merge points at which trains from different routes merge onto a common trackway. Many of the technical problems connected with such automation arise from the need that it be achieved consistent with the high traditional standards of safety of the passenger railway industry.

One aspect of the problem of achieving high safety standards is in connection with operation of binary data signal systems. Introduction of the higher degree of automation into transit systems requires a manifold increase in switching logic which can most readily be accommodated by binary data signal techniques. To achieve the necessary high standards of safety the binary data signal system must be made failsafe, and therefore employ failsafe components.

One of the basic building blocks of binary data systems is the logic gate network. It functions to detect simultaneous presence of a predetermined binary states at two or more inputs. The prior art logic gates, are constructed of transistors and diodes and their mode of operation involves the switching of DC levels. The quality of failsafeness is notoriously absent from these circuits. The likely failure conditions which can happen to these circuits, include resistors opening, electric leads becoming unconnected, transistors or diodes failing, etc. These failures often yield a TRUE output state and can equally yield an UNTRUE output state. This is inherent to the nature of semiconductor switches and the coupling of DC signals thereto. Attempts have been made to make transistor logic gate networks failsafe. These have included the so-called "redundancy" approach where redundant circuitry is provided to safeguard against any failure. This approach relies on the low probability of a combination of failures affecting all the redundant circuitry. Another approach is the so-called "-preferred failure mode" scheme. Here reliance is placed upon the circuit components failing to their most likely manner. For example, reliance is placed upon a resistor becoming "opened" and not short circuited. The circuit is then synthesized such that opening of any of its resistors yields a predetermined output condition. This is done for every component within the circuitry. Although these approaches have met acceptance in the aerospace industry, they have been deemed inadequate for rapid transit railway requirements. As a component of a railway system, a device can be exposed to an extremely long service life, direct exposure to the elements, and the possibility of vandalism. Because of the manifold character of these hazards, it is deemed that what is needed is a truly failsafe circuit construction. That is to say, a circuit construction is needed wherein any type of failure, whether by a likely failure mode or an extraordinary failure mode, or combinations thereof, will provide a safe failure.

Another aspect of the problem of achieving high safety standards is in connection with safety interlockings. The railway industry has traditionally resorted to implementation of interlocking a signal or control condition to presence of a monitored signal by use of the traditional railway vital relay device, which is an electromechanical construction. Briefly, the vital railway relay employs a very heavy relay armature and is so arranged that gravity will cause its contacts to open under any failure condition. The disadvantages of this approach include: limited switching speed (electromechanical construction); the bulkiness (particularly where two or more are cascaded); and their power requirements as electromechanical constructions.

Also, railway safety sometimes requires implementation of logical interlocking in the gating control of a plurality signal channels, where some of the signals are deemed "not safe" without the presence of a particular monitored signal. The gravity drop railway vital relay devices have been adapted to implement these logical interlocking functions, but with the aforementioned penalties of limited switching speed, bulkiness, and power requirement.

SUMMARY OF THE INVENTION

A sensor and enable gate stage is provided. Its utility is as a building block in arrangements of individual stages to form an AC enable signal circuit. A dynamic, or AC carrier signal is the signal medium of the enable channel. Each sense and enable gate circuit employs two principles which achieves failsafeness. These are: (1) reliance upon application of power to an active device to open the dynamic carrier signal channel; and (2) derivation of the power signal for the active device from an actuation signal having predetermined dynamic qualities by means of a unidirectional charge path capacitor circuit. The latter circuit charges a storage capacitor by dynamically "pumping up" the capacitor through a charge path including a unidirectional current device. Another construction feature which enhances failsafeness is a "thresholding" and a "gain and subsequent attenuation mode" within the dynamic carrier signal channel of each stage. Still another construction feature enhancing failsafeness is DC level shifting within the process of deriving the power switching signal to energize the active device. Circuit constructions are disclosed which may function as: (1) logical gate networks in certain types of binary data systems; (2) interlocking responsive to tone signals; (3) interlockings responsive to binary code combinations, and (4) implementing logical interlocking functions in gating a plurality of signal channels where one of the channels contains a signal which is "not safe" without the presence of a monitored signal.

Accordingly, the objectives of the present invention include provision of:

1. A family of electronic switching circuits having a failsafe construction whereby virtually any possible failure condition yields the same predetermined output mode, the predetermined failure output mode being one which is suitable to render safe the total system organization of which the circuit is part.

2. A circuit in accordance with the preceding objective which is adaptable to perform binary logic gate network functions in binary data signal systems having a signal format which exhibits dynamic behavior.

3. A circuit in accordance with the first objective which is adaptable to function as an interlock relay responsive to presence of a tone signal or in response to presence of certain binary code signals.

4. A circuit in accordance with the first objective which is adaptable to interlocking functions in the gating control of a plurality of signal channels.

5. An all electronic substitute for a railway vital relay device, which substitute has higher switching speed, is compact and has low energizing power requirements.

6. Electronic circuitry in accordance with the preceding objective which can be built inexpensively and has a high degree of immunity from conditions which could cause catastrophic failure of electromechanical components, such as frozen relay contacts, ingress of dust or mud.

DESCRIPTION OF PREFERRED EMBODIMENTS a. An overview of the embodiment of FIG. 1

Figure 1:
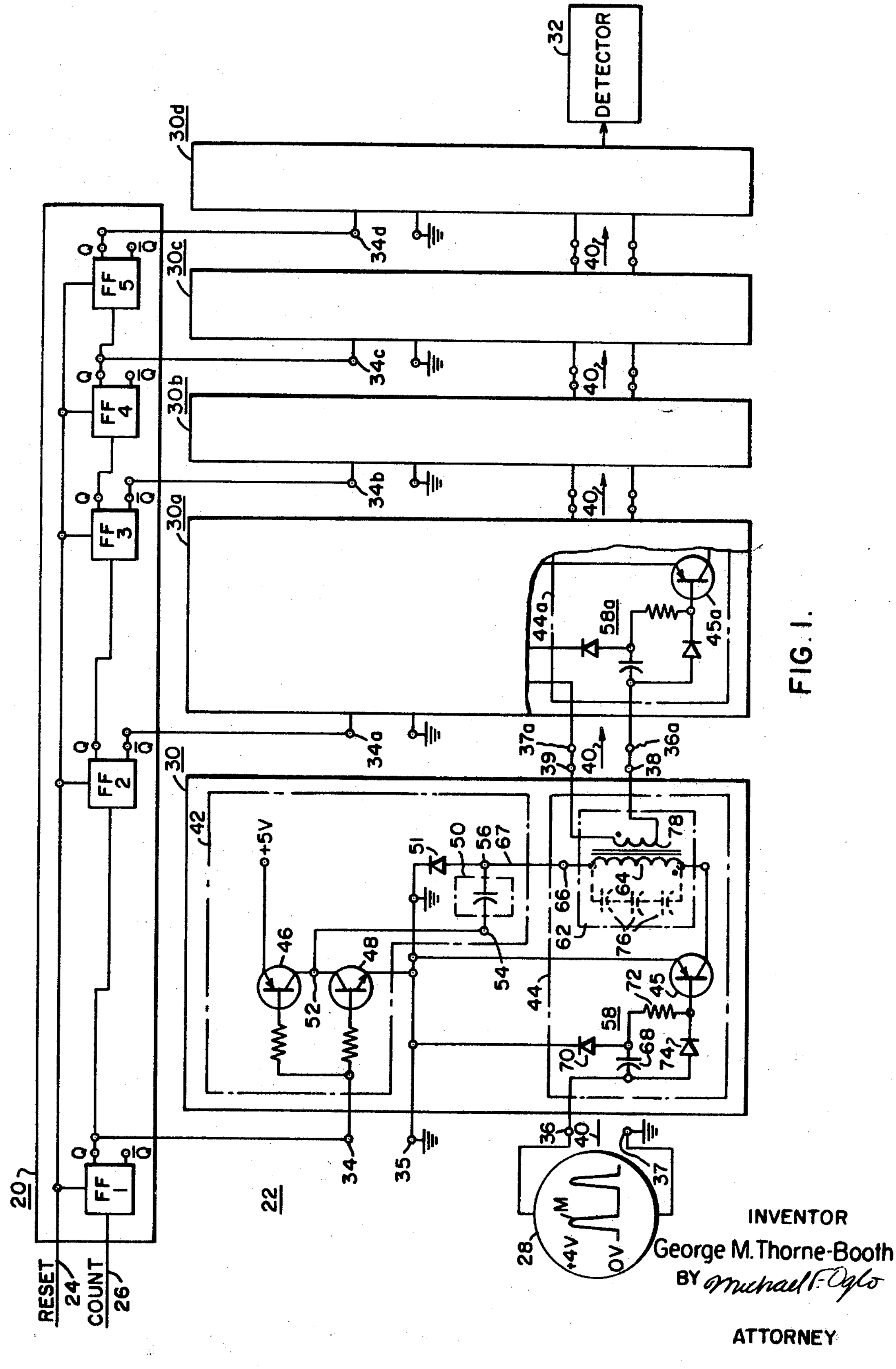
FIG. 1 is in part a schematic and in part a block diagram of a binary logic gate and dynamic confidence network containing failsafe switching circuits in accordance with the present invention.

Referring now to the drawing and in particular to FIG. 1, a synchronously recycling pulse counter 20 comprises a series of 5 flip-flop stages FF1,...FF5. Logic gate and dynamic digital operation confidence network 22 is interconnected with the outputs of the individual flip-flops.

One aspect of network 22 is its function as a logic gate to sense the presence of a predetermined count condition of recycling counter, and to provide a HIGH state output signal whenever this count condition is present. The embodiment depicted in the drawing is shown wired to sense a count condition of 25 (decimal), or 11001 (binary), it being understood that this is merely illustrative of sensing any one of the possible 32 count conditions of the five-stage counter. In performing this function it is working in the fashion of an AND gate network.

Another aspect of network 22 is a function to sense whether counter 20 is operating in a dynamic manner characteristic of a normal recycling mode of operation. The output of network 22 can be in a HIGH state signal if the characteristic dynamic digital operation of counter 20 is present. Both the logic gate and dynamic operation sensing functions are performed simultaneously. This presence of a HIGH state output means that counter 20 is in its 11001 condition and that it is operating dynamically.

It will be appreciated that the common form of circuit construction for an AND type logic gate network is the so-called "diode-transistor logic" form of circuitry. That form of circuitry employs DC signal modes. Circuit 22 performs the AND gate function with a different form of circuit construction having a different signal mode. The signal mode of the present invention is to operate on an AC enable signal. As will become apparent, the primary purpose for using such AC enable signal mode is to achieve the property of fail-safeness.

b. Requirement of Failsafeness Illustrated By Reference to Multiplex Communication For Railway Track Speed Block System Counter 20 and logic gate and dynamic digital operation confidence network 22 find use in connection with the multiplex system disclosed in the copending application to G. M. Thorne-Booth and R. C. Hoyler entitled "Control Of A Vehicle Along A Path Divided Into A Plurality of Signal Blocks", Ser. No. 762,563, filed Sept. 25, 1968. More particularly, they function as the enable pulse generator for the demultiplexing unit associated with each individual speed signal block. The multiplex system in that copending application is of the well-known time-division-type. The individual speed control signals for the different speed blocks of a track system are communicated along a common hard wire transmission line. The multiplex system is timed by a synchronously reset counter system and the signal states in different count condition time periods are the different speed block signals.

For example, the binary coded train speed signal intended for a speed block M may be multiplex along the transmission wires as signal states occurring in the 24 count condition of a 32 count cycle. The signal for another speed block N may be transmitted as the signal state of the 25 count conditions and the speed signal for a speed block 0 as the 26. The speed signals command a train within the corresponding block to travel at a variety of speed performance levels between zero miles per hour (m.p.h.) and 80 m.p.h. The actual speed control command is determined by a variety of factors including safety conditions and maintenance of a train schedule in the speed block. For example the train control signal to speed block M may command a maximum speed level of 80 m.p.h., and that to speed block N may command an 18 m.p.h. speed level because of a safety condition in the latter speed block.

Counter 20 and logic gate and dynamic digital operations confidence network 22 would function to provide pulse enabling the speed block N equipment to accept the signal state present in the transmission line during the 25 count conditions.

Failsafeness is concerned with the consequence of malfunction or failure of a device or circuit. In the case of a diode and transistor equivalent circuit of network 22 there are basically two possible output failure modes. One is the possibility of a malfunctioning producing a HIGH output signal state and the other the possibility of causing a LOW output signal.

A failure of the first type results in acceptance of a signal from the multiplex communication line, and could cause a wrong control to be introduced to speed block N. This could lead to catastrophic consequences. One example of this would be a malfunction which would cause counter 20 and network 22 to provide a HIGH output state one count condition too early in a count cycle, so that the enable pulse for station N would be concurrent to count condition 24 instead of 25. Using the foregoing illustrative speed command values, station N would receive the 80 m.p.h. command instead of the 18 m.p.h. speed command dictated by reasons of safety. The possibility of catastrophic consequences are obvious. Because of the possibility that a failure yielding a HIGH output state could cause this type of consequence, the HIGH state output mode is deemed the "not safe" output mode in considering the failsafe properties of network 22.

A malfunction resulting in a LOW output state will simply never actuate the speed block equipment to accept any signal from the multiplex transmission lines, and therefore a train in the speed block will receive no signal. In accordance with conventional railway systems engineering techniques, the speed controls aboard the trains are adapted to cause zero speed whenever no signal is received by the train. For that reason the LOW state output mode of network 22 is deemed its "safe failure" mode.

The failsafe requirement for network 22 therefore is that every possible failure of a component or combination of components of the network must unconditionally result in a LOW state output.

The preceding is concerned with the consequence of failure of operation of network 22 per se. There is also a failsafeness requirement which involves the operation of counter 20 in conjunction with network 22. Here the more likely modes of failure include possibility of one of the flip-flop stages in counter 20 becoming "frozen" in one of its states, or the possibility of all the stages becoming frozen. This could result in an erroneous HIGH output state from network 22 with the same possibility of catastrophic consequences.

The failsafeness requirement for the operation of counter 20 in conjunction with network 22 therefore is that failure modes in the nature of one or more of the flip-flop stages becoming frozen in one of the states must unconditionally result in a LOW output state.

As will be understood as the description proceeds, logic gate and dynamic digital operation confidence network 22 features these failsafe properties. Therefore in the railway communication and control art it is sometimes referred to as a "Failsafe AND gate network."

c. Construction and Operation of the Embodiment of FIGS. 1 and 3

Flip-flops FF1, ...FF5 are interconnected in the conventional arrangement of a pulse counter which is reset by a separate pulse input. Each flip-flop has a pair of output terminals Q,$\overline{Q}$ such that in its ZERO state Q is Low and $\overline{Q}$ is HIGH. In its ONE state Q is HIGH and $\overline{Q}$ is LOW. Each flip-flop also has a RESET input which sets it to its ZERO state in response to a pulse received via a reset pulse line 24 which is parallel connected to the RESET inputs of all the individual flip-flops. The count pulses are applied from a count input line 26 to the toggle input of flip-flop FF1. The Q output terminals of each flip-flop stage are connected to the toggle input of the following stage.

Exemplary values of timing and signal characteristics in the operation of counter 20 and network 22 used as the demultiplexed enabler for the railway speed control system of the previously cited copending application are as follows: RESET pulse period—18 pulses per second; count pulse frequency—576 pulses per second; HIGH state—+6 volts; and LOW state—0 volts DC. Note that a RESET frequency of 18 pulses per second with a pulse count frequency of 576 pulses per second yields 32 count pulses between each RESET. This is matched to the capacity of the five flip-flop stages to count up to 32 in binary code.

The maximum period in which any counter flip-flop remains in one of its states will also be referred to in the ensuing description. Flip-flop FF5 has the longest period of time in one state. For the given example of timing, this period is approximately 1/36 of a second. It is the time when FF5 is RESET to ZERO and when the counter counts to 32, which changes FF5 to its ONE state.

The main components of AND gate type logic circuit 22 comprise a carrier signal generator 28, a series of sensor and AC enable gate stages 30, **30*a*...30*d*, and a detector circuit 32**.

Generator 28, is shown in block diagram fashion by a circular block. A section of its periodic pulse wave output is represented by Wave M, depicted in the signal source. This consists of a periodic positive 4-volt pulse wave having a width approximately 1/5 of the total waveform period. More particularly, the pulse width is chosen to cooperate with the self ringing characteristics of inductive elements in stages 30, 30*a*, etc., as will become understood as the description proceeds. A suitable pulse frequency for use with the previously given exemplary timing information would be 155 kHz. A preferred construction of generator 28 is hereinafter described in detail in conjunction with FIG. 3.

The series of sensor and enable gate stages 30, **30*a*, etc. correspond to the series of flip-flops FF1,...FF5. Each stage 30 has two sets of inputs terminals and a set of output terminals consisting of: the stage actuation input terminals 34, 35; AC enable signal input terminals 36, 37 and AC enable signal output terminals 38, 39. Terminals 34, 36, and 38 are the high terminals and terminals 35, 37 and 39 are the grounded terminals. The high terminals 34, 34*a*...34*d* of the stage actuation inputs are selectively connected to the one of the output terminals Q, $\overline{Q}$ of the corresponding counter flip-flop stage that will be in a HIGH state when the counter is in its 25 (decimal), or 11001 (binary), count condition. The AC enable signal terminals (i.e. the input set 36, 37 and the output set 38, 39 of the stages 30, 30*a*...30*d*) are connected together in cascade fashion from an AC enable signal channel 40** which extends through all the sensor and enable gate stages.

Detector circuit 32 should be of a failsafe construction such that no possible failure or malfunction thereof will provide a HIGH output state. One suitable construction consists of a transformer to provide the desired output voltage level, a crystal filter tuned to the frequency of the AC carrier signal, and a passive diode rectifier device. It can be shown that any possible failure or malfunction in this combination of components provides a zero or LOW output state.

The sensor and enable gate stages 30, **30*a*...30*d* are all alike, so that the following description of one stage will serve for all. The two major subparts of each stage are a unidirectional charge path capacitor circuit 42 and a gate and threshold circuit 44. Gate and threshold circuit 44 contains a gating switch 45 and threshold resistor 22 which is ON-OFF switched by selective application of the collector potential thereto. Unidirectional charge path capacitor circuit 42 functions to provide this ON-OFF switching signal to transistor 45**.

Figure 2:
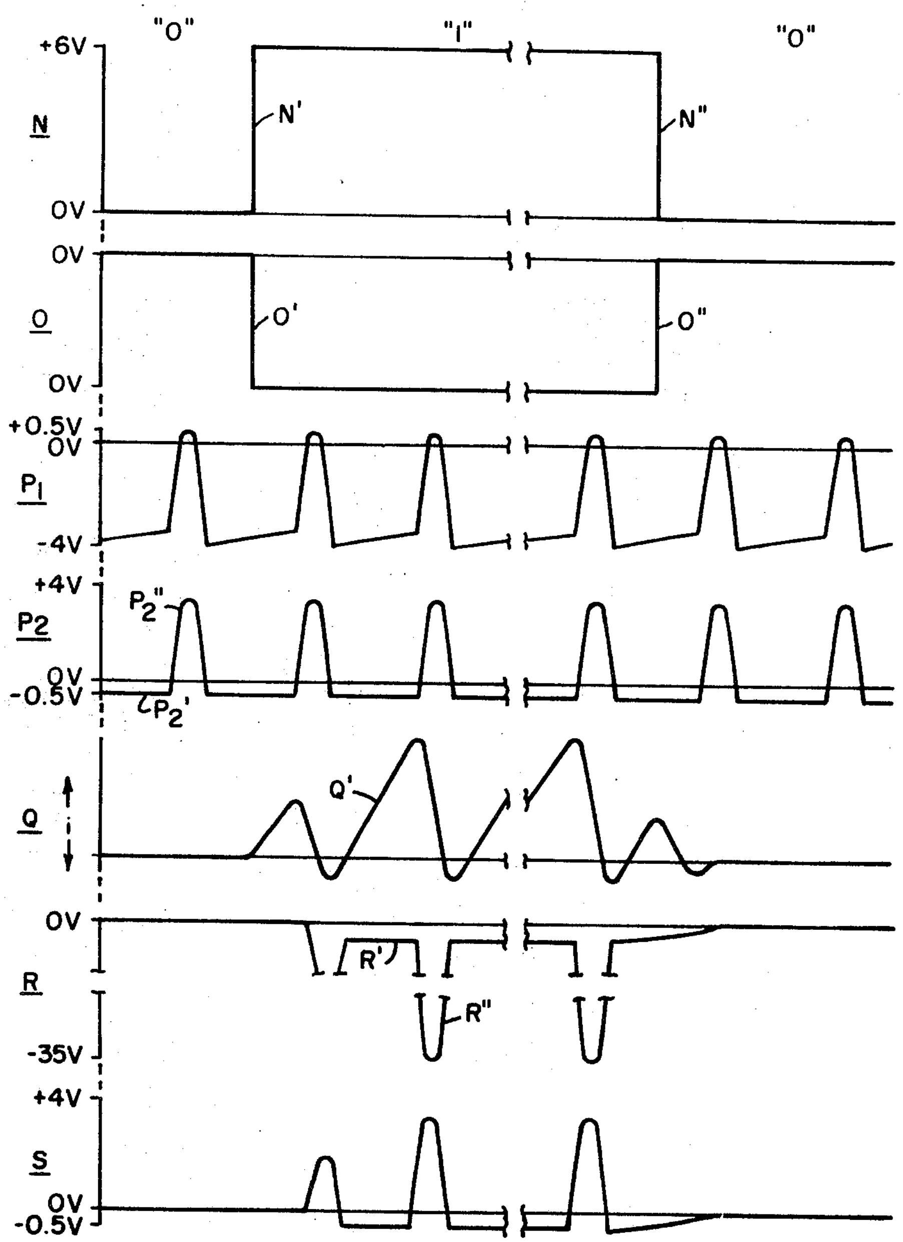
FIG. 2 illustrates certain waveforms present in FIG. 1.

The main parts of unidirectional charge path capacitor circuit 42 comprise complementary transistors 46 and 48 and a network composed of capacitor 50 and diode 51. Transistor 46 is of the PNP-type and transistor 48 is of the NPN-type. They are connected back-to-back with their collectors joined at a common circuit point 52. The emitter of transistor 48 is returned to ground and the emitter of transistor 46 is connected to a +5-volt supply. The binary signal from terminal Q of flip-flop FF1 is shown as Wave N, FIG. 2. It is applied to terminals 34, 35 and thence coupled to the bases of both transistors 46 and 48 via base resistors. The alternative LOW and HIGH voltage states of this signal, 0 volts, and +6 volts respectively, switch circuit point 52 between +5 volts and 0 volts (the waveforms at point 52 not shown in the drawings). Capacitor 50 has an electrode terminal 54 which is connected to circuit point 52, and another electrode terminal 56 which is the output terminal of capacitor circuit 42. Diode 51 is connected between the latter electrode terminal 56 and ground, and is poled with its cathode returned to ground so that it clamps capacitor terminal 56 to ground when circuit point 52 is in its +5-volt state. When this happens capacitor 50 takes on a charge. The charge path is predetermined to have a time constant of the order of 1/5 of the bit period corresponding to one count condition of counter 20 so that it quickly charges to 5 volts. The capacitor terminal 54 is positive relative to terminal 56. Referring to Waves N and O of FIG. 2, a LOW-to-HIGH wave excursion N′ switches circuit point 52 to a 0-volt state. Diode 51 is turned OFF so that terminal 56 is no longer clamped to ground. Instead, terminal 54 is effectively clamped to ground and terminal 56 undergoes a 0-volt to −5-volt excursion O′ because of the charge across the capacitor. The discharge time constant of capacitor 50 is predetermined to be approximately five times longer than the maximum HIGH state period. This is determined by the size of capacitor 50 and the level of current drawn by transistor 45 in gate and threshold circuit 44. A typical value for capacitor 50 is 39 microfarads. Accordingly the −5-volt signal state will remain at terminal 56 concurrent with presence of a HIGH state to input terminals 34, 35. Upon a HIGH-to-LOW wave excursion N″, diode 51 is again turned ON and a −5-volt to 0-volt wave swing O″ occurs at terminal 56. Capacitor 50 thus serves as a unidirectional capacitor memory which remembers that the input signal to terminal 34 has had a positive excursion and no subsequent negative going excursion. Because its charge must be replenished and can only be replenished during a LOW state of Wave O, the presence of the −5-volt state at terminal 56 is an indication of confidence that the input to terminal 34 has been dynamic by the criterion predetermined up by the discharge time constant of capacitor 50. It should be noted that Wave O, the signal appearing at terminal 56 is in effect a level shifted form of the input to terminal 34, in which the shift is to the opposite voltage polarity. The signal at terminal 56 is the output of unidirectional charge path capacitor circuit 42 which ON-OFF switches the transistor 45 in gate and threshold circuit 44.

The main parts of gate and threshold circuit 44 comprise transistor 45 (previously noted) which is of the PNP-type, an input network 58, and a stepdown transformer 62. The primary winding 64 of the transformer has one of its terminals connected to the collector of transistor 45. The other terminal 66 is the ON-OFF switching input to which is applied the negative operating potential needed as the collector potential for PNP transistor 45. Accordingly an output from unidirectional charge path capacitor circuit 42 is directly coupled to power switching input terminal 66 by a wire 67. Input network 58 contains a capacitor 68 and a diode 70 which together serve as a clamping network to clamp their junction of (between 68 and 70) to zero. The wave at this junction is shown as Wave $P_1$, which is coupled to the base of transistor 45 via resistor 72. The wave at the cathode of diode 74 is shown as Wave $P_2$, FIG. 2. The baseline sections $P_2'$ of the wave form a negative excursion having a magnitude of approximately minus 500 millivolts. The positive pulses $P_2''$ are the charge restoring excursion for the clamping capacitor 68. This clamped waveform, as mentioned above, is applied to the base of the transistor 45 via base resistor 72. The diode 74 connected between input terminal 36 and the base of transistor 45 effects quick response to the positive pulses $P_2''$. When the signal at capacitor terminal 56, Wave O, is at its 0-volt state, transistor 45 is deenergized. It acts as a CLOSED gating switch, so that its collector current, Wave Q is zero. When terminal 56 is at its −5-volt state, transistor 45 is energized and acts as an OPEN gate subject to the threshold action of its base emitter junction. The minimum forward conducting voltage across this junction is about minus 300 millivolts, which defines the threshold level for switching the transistor ON. Since the baseline section $P_1'$ of Wave $P_1$ is nominally minus 4 volts, it will exceed this threshold and turn the transistor ON. The primary winding 64 of transformer 62 acts as an inductive load in the collector circuit. In accordance with well-known principles a buckling voltage results in a linearly positive going "ramp" section Q' in Wave Q of current through the collector circuit of transistor 45. (Note, a steady-state wave is not reached in the first enable signal period) The resultant waveform R across primary winding 64 has a baseline section R' of a constant small negative voltage coinciding with the ramp sections Q' of Wave Q. The positive pulses $P_2$ of Wave $P_2''$ abruptly switch transistor 45 OFF. It is seen, therefore, that whenever transistor 45 is energized in response to terminal 56 being at its − 5-volt state, transistor 45 is turned on in response to the −4-volt level of wave $P_1$ being applied to its base electrode, and is turned off in response to the $P_2''$ pulse of wave $P_2$ being applied to its base electrode. During the ramp section Q' of Wave Q the inductor stores energy and the abrupt switch OFF of current causes the well-known large voltage spike R'' of Wave R across the winding. Input winding 64 has inherent distributed equivalent shunt capacitance thereacross, shown diagrammatically by broken line capacitors 76, and therefore has a frequency of self-resonance. As previously noted the width of the positive pulses $P_2''$ was matched to this self-resonance characteristic to produce the maximum self-ringing effect, and thereby maximize the magnitude of voltage spike R''. In a typical situation the magnitude of spike R'' is approximately eight times greater than the corresponding pulse $P_2''$ in wave $P_2$ (Wave R as depicted in the drawing is broken away in its vertical dimension). Highly successful results have been obtained using a transformer 62 having the following characteristics:

Core material Ferrite (Generic—Not a Trademark name)

Core configuration & dimensions

Toroidal type core having dimensions of 0.5 outer diam. and 0.281 inner diam.

Primary winding 34 turns of 38 A.W.G. wire in three bobbin layers separated by a double thickness of masking tape Secondary winding 4 turns 38 A.W.G. single layer Approximate inductance of primary—6.15 mH Approximate Equivalent shunt capacity of primary— 8.0 p.f. The secondary winding 78 of transformer 62 is wound to provide a voltage step down of the order of 10:1, and is poled to invert the signal. As a result of the attenuation and polarity inversion the signal appearing at the AC enable output terminals 38, 39 Wave S, is substantially a reconstructed version of Wave M applied from signal generator 28. Thus, when gate and threshold circuit 44 is in its OPEN GATE condition it is effectively a unity gain amplifier.

From terminals 38, 39 the signal S is directly coupled to the input terminals 36*a*, 37*a* of the next stage 30*a*. The input network 58*a* clamps the waveform about zero in the same manner as in stage 30. Again the baseline section of the waveform is approximately minus 4 v. which will exceed the base-emitter junction threshold of transistor 45*a*.

It is to be noted that the attenuation provided by stepdown transformer 62 in stage 30 cooperates with the base-emitter thresholding action in stage 30*a* to ensure interruption of the AC enable signal channel in the event of malfunction in stage 30. If the amplification provided by transistor 45 in stage 30 is degraded by a mulfunction, the 10:1 voltage attenuation provided by transformer 62 will not couple sufficient signal into stage 30*a* to exceed its threshold. In fact, it has been found that this cooperation is effective to interrupt the AC enable signal channel in even the extreme failure condition of the input signal, Wave M, somehow appearing across primary winding 64 of transformer 62. In such a case the 10:1 attenuation of transformer 64 would not couple an amplitude of signal into stage 30*a* yielding a waveform with baseline sufficiently negative to exceed the threshold.

The operation of logic gate and dynamic state confidence circuit 22 will be apparent from the preceding description. Assume that synchronously recycling pulse counter 20 is normally operating. In each cycle it counts up from the zero through 32, and will pass through the 25 (decimal), or 11001 (binary) count condition. In that condition HIGH state signals will be applied to the stage actuation input terminals of all the sensor and enable gate stages 30, 30*a* ... 30*d*. Normal dynamic operation or recycling counter 20 causes the individual flip-flops FF1 ... FF5 to alternate state at least once during the count cycle, so that the capacitor 50 in the unidirection charge path capacitor circuits 42 of each stage will have charges. Accordingly the circuit 42 of each stage will be operative to level shift the HIGH state actuation input signal to the negative voltage state for energizing the collector of the transistor 45 in the gate and threshold circuit. This enables all the stage 30, 30*a* ... 30*d* to act as OPEN transfer gates, which therefore act in cascade to complete AC enable channel 40 and deliver the AC carrier signal from signal generator 28 to detector circuit 32. The detector 32 rectifies the AC carrier and provides a DC output simultaneously with the presence of the 10011 count condition in counter 20. During any of the other 31 count conditions of counter 20, the actuation input of at least one of sensor and enable gate stages is at its LOW state so that the stage's gate and threshold circuit will INTERRUPT the AC enable signal channel 40.

An important feature of sensor and enable gate stage 30, and the total logic gate and dynamic digital operations confidence network 22 built up from such stages, is their failsafe properties. This includes both failsafeness in the situations of failures of components in their most likely mode of failure and failsafeness in cases of extraordinary failure modes.

Cases of failures modes which most likely include resistors opening, electric leads becoming unconnected, and diodes and transistors failing in their common failure modes. It can be demonstrated that such events will result in: (a) failure of the normal cyclic charging of capacitor 50 needed to energize transistor 45; (b) simple loss of AC enable signal through open circuiting; or (c) such degradation of the amplitude of the AC enable signal that attenuation by the stage stepdown transformer will cause the signal coupled into the next stage to be insufficient to exceed its threshold. In turn, the AC enable signal channel will *not* be completed and the output from the detector circuit 32 of the total logic gate network and confidence circuit will be the LOW voltage state, or its "safe failure condition."

Cases of failure modes which are extraordinary are obviously difficult to predefine, but could include unauthorized short circuiting of signal across intermediated portions of a signal path and unauthorized short circuiting of power supply potential to various parts of the circuit. Included among the structural features which yield and virtually unconditional fail-safe properties against such extraordinary failure modes are the following:

1. Gating of the AC enable signal in each sensor and enable gate stage 30 is performed by the switching mode consisting of the ON-OFF switching of power to an active device.

2. The power switching signal to the AC enable signal gating transistor 45 is coupled thereto through a charge circuit of a capacitor with an unidirectional charge path in a manner requiring the capacitor to be cyclically charged before the active device can be switched ON.

3. The unidirectional charge path capacitor circuit 42 interjects a level shift from +5 volts to −5 volts. As a result, the negative voltage needed at terminal 56 which is the ON switching signal for transistor 45, cannot be supplied by an accidental short circuit to the positive power supply.

4. The cooperation of the attenuation provided by the transformer 62 at the output of a sensor and enable gate stage 30 with the thresholding action of the base-emitter junction of the transistor 45 in the succeeding stage narrows the tolerances of normal operation of a stage.

5. Matching the dynamic carrier signal used as the AC enable signal to the ringing time of natural frequency of primary winding 64 offers several advantages.

a. The high amplitude of the resultant voltage spike enables use of a high attenuation ratio in cooperation with the threshold of the succeeding stage.

b. The winding 64 and its stray capacitance 76 is effectively a tuned circuit having a greater impedance than any other part of the circuit. Any short circuited or open circuit thereof will either detune the effective tank circuit or cause total loss of output.

6. The interjection of a polarity inversion between primary winding 64 and secondary winding 78 of transformer 62 obviates possibility of directly applying the spike seen in the input into the succeeding stage.

7. The use of the stepdown transformer 62 as the attenuation and output coupling means offers several advantages.

a. Transformer windings, unlike the resistors used in a resistive voltage divider, are not subject to drift in values which might increase the output, nor subject to causing increased output in the event they are open circuited.

b. The fact that the secondary winding is a separate current signal path from the primary winding provides more reliable DC isolation and more reliable AC isolation of the high-level signal from the succeeding stage.

c. The transformers may be readily constructed with a physical separation of the primary and secondary windings. This reduces the possibility of short circuiting the primary to the secondary to a negligible likelihood.

Another important feature of stage 30 and the total logic gate network and confidence circuit 22 is their operation to provide confidence that a system or subsystem having a predetermined dynamic characteristic, such as recycling counter 20, is operating with normal dynamicism. For example, in the event that one of the flip-flop of counter 20 "-freeze" in one of its states, the charge on the capacitor 50 in the corresponding sense and enable gate stage would not be re;lenished. Transistor 45 would turn OFF and the stage would act as a CLOSED transfer gate in the AC enable signal channel 40. The output of logic gate network and confidence circuit would be a LOW state, or "safe failure mode" condition.

THe following circuit specifications for network 22, FIG. 1 are included by the way of example only. They are for a circuit previously described exemplary construction of transformer 62, to provide the exemplary circuit operation value given in the course of the preceding description.

| | |
|---|---|
| Transistor 45 | Type 2N2907 |
| Transistor 46 | Type 2N2907 |
| Transistor 48 | Type 2N2222 |
| Diodes 51, 60, 74 | Type 1N914 |
| Capacitor 50 | 39 F |
| Capacitor 68 | 0.01 F |
| Resistor 72 | 1.3 K |

Figure 3:
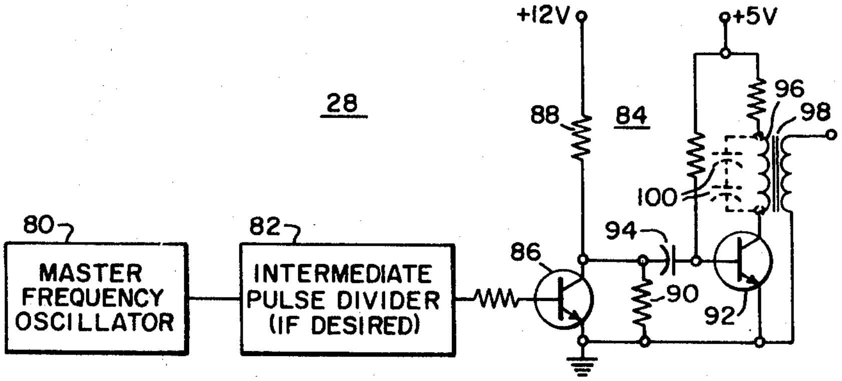
FIG. 3 is a detailed schematic of an element shown by block in FIG. 1.

FIG. 3 shows a preferred construction of a carrier signal generator 28. Its major components comprise a master oscillator 80, a pulse divider 82 and a pulse shaping circuit 84. Master oscillator 80 and pulse divider 82 serve to produce a symmetrical square wave for the input of pulse shaping circuit 84. This square wave is applied to the base of a transistor 86 in circuit 72 via a base resistor. THe collector of transistor 86, which is connected to a +12-volt supply, is switching up and down. A collector resistor 88 disposed between the collector and the supply and another resistor 90 between the collector and ground serve as a potential divider in reference to the +12-volt supply. This reduces the signal swing applied to the base of following transistor 92 to a value which will not "zener off" its base-emitter junction. The signal at the collector of transistor 86 is coupled to the base of transistor 92 via a coupling capacitor 94. The collector of transistor 92 is connected to a + 5-volt supply through the primary winding 96 of a transformer 98. The primary winding 96 is essentially the same as the primary winding 64 of transformer 62 in the sensor and enable gate stages 30, 30*a* ... 30*d*. It has its like characteristic equivalent shunt capacitance 100 (dotted lines). The time constant provided by capacitor 94, resistor 88, and resistor 90, is matched to the "ringing time" of the natural frequency of primary winding 96 and its associated equivalent shunt capacitance 100. A negative excursion of the collector of transistor 86 will turn OFF transistor 92. This is analogous to turning off the gating switch transistor 45 in a sensor and enable gate stage 30. The primary winding 96 of the transformer 98 will ring in exactly the same fashion. This establishes the natural pulse wave M, FIG. 1, which is the carrier signal for the AC enable channel. The baseline period of the wave is quite accurately governed by the master oscillator. This resultant waveform is inherently compatible with the construction of sensor and carrier gate stages, which use transformers having essentially identical characteristics, and will be reliably passed with unity gain through the gate and threshold circuit 44 of such a stage.

d. Description of Embodiments of FIGS. 4 through 11

Figure 4:
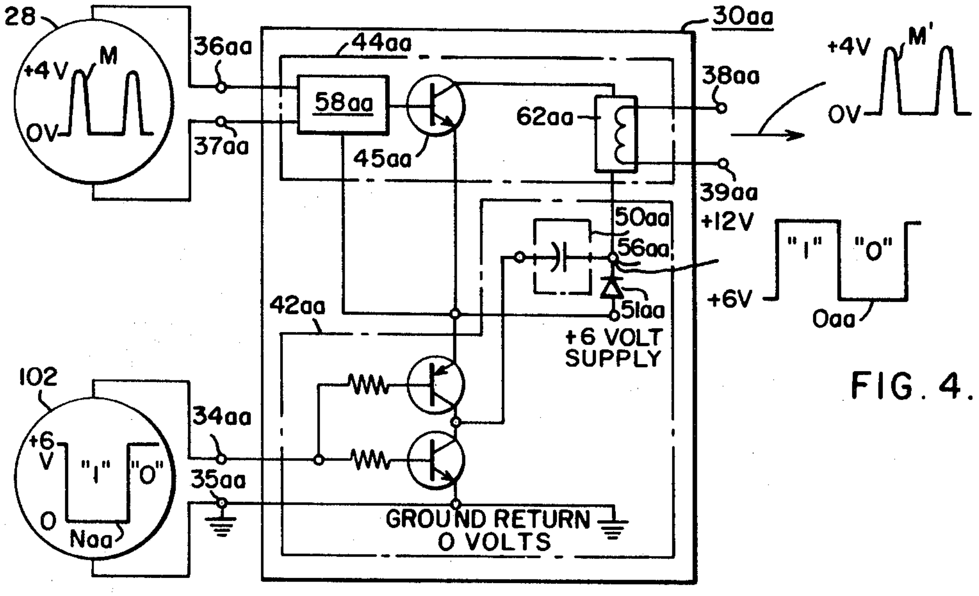
FIG. 4 is a modification of an element in FIG. 1.

FIG. 4 shows a modified construction of sensor and enable gate stage 30*aa* which acts as an OPEN enable gate when the LOW state is applied to stage actuation input terminals 34*aa*, 35*aa*. THis allows construction of more versatile AND gate-type logic circuits which can be connected to circuit points which will be in the HIGH or LOW to yield the logical TRUE condition. Stage 30*aa* has a gate and threshold circuit 44*aa* with an input signal M essentially the same as circuit 44 except that its transistor 45*aa* is of the NPN-type and the circuit is ground referenced to a +6-volt supply. (This accounts for the transposition of the location of circuits 42*aa* and 44*aa* FIG. 4; relative to circuit 42 and 44 FIG. 1). Stage 30*aa* also has a unidirectional charge path capacitor circuit 42*aa* in which the same antiphase arrangement of transistors as in circuit 42, FIG. 1, is used. Here, however, the arrangement of capacitor 50 *aa* and diode 51*a* has the diode connected with its anode side to the +6-volt supply. With this arrangement the capacitor terminal connected to the diode is clamped to +6 volts when there is a negative excursion at circuit point 52*aa*. On the next positive going swing at circuit point 52*aa* the capacitor provides a +12-volt supply at its terminal 56*aa*, which energized transistor 45*aa*. Thus, by referencing stage 30*aa* in this fashion and causing a level shift to a higher positive potential, stage 30*aa* provides an AC enable path so that a reconstructed input wave M' is present at output 38*aa*, 39*aa* when its actuation input is LOW. It provides a CLOSED gate to an AC enable signal when its actuation input is HIGH. The level shifting has been depicted on the drawing. A short section of a binary waveform, N*aa*, is depicted in a signal source 102 connected to terminals 34*aa*, 35*aa*. The corresponding output binary waveform, O*aa*, appearing at capacitor terminal 56*aa* is also depicted on the drawing. The failsafe qualities of stage 30*aa* the same as that of stage 30.

Although gate and threshold circuit 44 has been described with reference to an effective tuned circuit consisting of the primary winding of a transformer and its stray capacitance, it will be appreciated that a lumped element tuned circuit consisting of an inductor and lumped shunt capacitors could be used as well. In the latter case the DC isolation and attenuation could be provided by a shunt capacitance network chosen to be a capacitor voltage divider. Such a circuit would at least be satisfactory for many applications and would be slightly less expensive. However it should be noted that using a capacitor voltage divider as the attenuator network is not as failsafe against extraordinary failure modes as a transformer, since short circuiting of the terminals could result in transfer of the full signal to the next stage.

Also, while the dynamic confidence aspect of network 22 has been illustrated in conjunction with a recycling counter, it will be appreciated that this feature can be used with other digital systems having a predetermined dynamic characteristic. One example is a signal channel transmitting the so-called "comma free" binary code, which is employed in the railway speed control system of the previously cited copending application. With that coding scheme, any digital signal wave has a predetermined minimum frequency of alternation between HIGH and LOW stages. Network 22 can be employed as a logic gate in conjunction with this signal, and by choice of circuit values for its unidirectional charge path capacitor circuits 42, can also provide confidence that the signal behaves in a dynamic manner.

Figure 5:
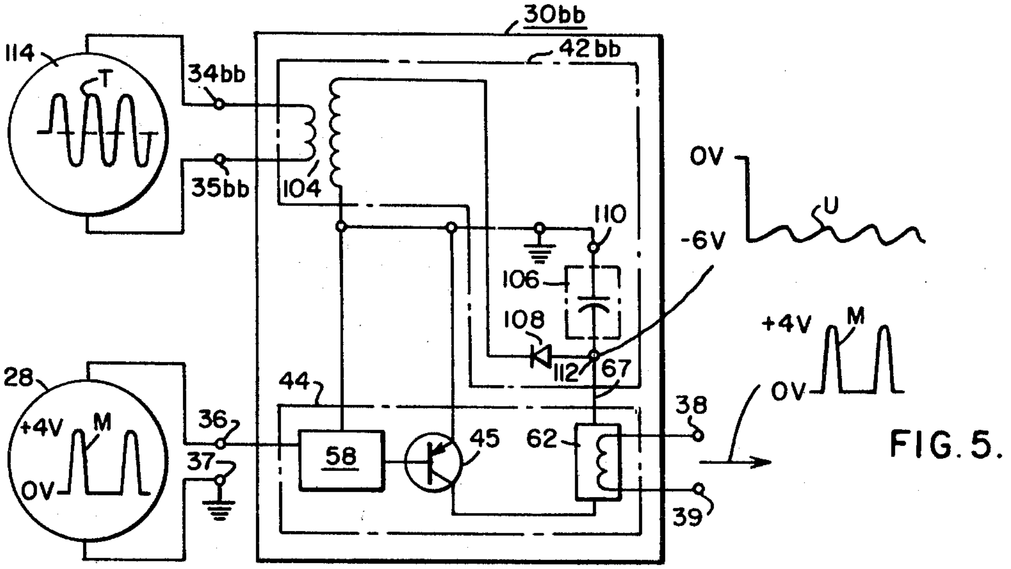
FIG. 5 is an alternate form of invention which functions as an interlock relay responsive to presence of a tone signal.

FIG. 5 illustrates an alternate form of invention in which a sensor and enable gate stage 30*bb* acts in the fashion of an electronic relay which interlocks the AC enable channel to the presence of an audio frequency (AF) tone signal at its stage actuation input 34*bb*, 35*bb*. The AC enable channel part of the stage is the same as that for stage 30, FIG. 1. However, its unidirectional charge path capacitor circuit 42*bb* comprises an input transformer 104, and a capacitor 106 and diode 108 which are series connected across the transformer's secondary winding. One terminal of the secondary winding and one terminal 110 of capacitor 106 is connected to ground. The diode 108 is connected between the other terminal of the secondary winding and the other terminal 112 of capacitor 106. In a typical railway communication and control system application the signal source 114 would be a signal from an antenna which couples out an AC signal from a track circuit. A section of an AF tone signal is represented by Wave T, depicted in signal source 114. Wave T is normally of a relatively much lower frequency than Wave M. (The time scales on the drawings are different). Capacitor 106 and diode 108 rectify this signal providing a continuous negative DC level of approximately −6 volts at terminal 112. This is depicted as Wave U shown in FIG. 4. This negative potential is coupled to the collector circuit of gate and threshold transistor 45 in circuit 44 by a wire 67 like in stage 30, FIG. 1. It is to be noted, however, the capacitor 106 here is acting as a reservoir capacitor rather in the fashion of a unidirectional capacitor memory of capacitor 50, FIG. 1. In the case of stage 30, FIG. 1, the enable gate and threshold circuit is switched OPEN and CLOSED as the signal stage actuation input switches between HIGH and LOW state. Here the enable gate and threshold circuit 44 remains in its OPEN state as long as the AF signal to its input 34*bb*, 35*bb* is continuous. A reconstructed version of the input, Wave M', shown in FIG. 5, appears at the output 38, 39. Typically, stage 30*bb* is cascaded connected with a series of sensor and enable stages of the type of stage 30, FIG. 1, the latter series of stages performing a desired gate function. The resultant AC enable gate channel (corresponding to channel 40, FIG. 1) provides the desired logic function and also a confidence network function which indicates the AF signal is present at terminal 34*bb*, 35*bb*.

Figure 6:
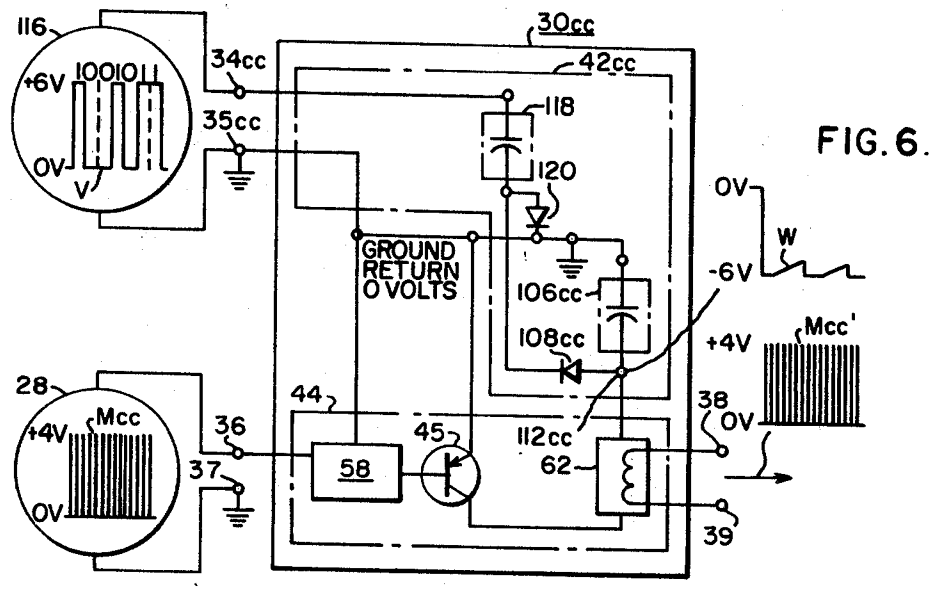
FIG. 6 is an alternate form of invention which functions as an interlock relay responsive to presence of a certain binary data code signals.

Sensor and enable gate stage 30*cc*, FIG. 6 is similar in its function to stage 30*bb* of FIG. 5. The dynamic, or AC carrier signal from generator 28 is enabled by a normally continuous signal applied to stage actuation input terminals 34*cc*, 35*cc* (Note that the AC carrier wave M*cc* depicted in generator 28 is intended to represent the same signal as Wave M of FIGS. 1, 2, and 3, but is shown here in a compressed time scale). Here however, the source 116 connected to input 34*cc*, 35*cc* is a logic switching output providing a continuous serial binary signal, Wave V, coded in predetermined 6-bit combinations of logic ZERO and logic ONE states, known as "comma free coding." It is a characteristic of comma free coding that the serial signal has a predetermined minimum frequency of alternation between ZERO and ONE states. Stated another way, the binary wave will not stay in any one state more than a predetermined number of bit periods. For illustration of the comma free code combinations reference is made to the previously cited copending application entitled "Control of a Vehicle Along a Path Divided Into a Plurality of Signal Blocks," and particularly at page 3, line 23, thereof. The Wave V depicted in source 116 represents the 27 m.p.h. speed command signal therein. As in the case of stage 30*bb*, FIG. 5, there is a reservoir capacitor 106*cc* and a unidirectional charge path diode 108*cc* for charging the capacitor to a negative level at its diode-side terminal 112*cc*. Here, however the terminals 34*cc* and 35*cc* are directly connected to a capacitor pump arrangement consisting of a capacitor 118 and diode 120. Capacitor 118 is of a suitable size to provide the pumping action which keeps the terminal 112*cc* at a negative voltage level. The time constants are so chosen that the minimum frequency of occurrence of HIGH state signals in the serial binary wave will maintain a negative DC level at terminal 112*cc* as depicted by Wave W in FIG. 6. Note that unidirectional charge path capacitor circuit 42*cc* provides a level shift to an opposite polarity of output signal just in stage 30, FIG. 1. The same benefit in failsafe properties inures. Although a transformer is not needed by this agreement, it should be noted that one could have been used at the input of circuit 42*cc*.

Figure 7:
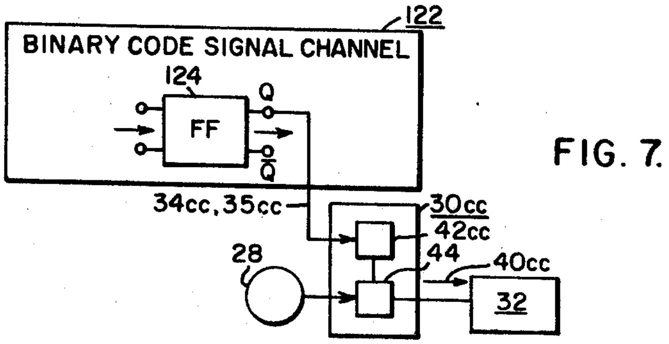
FIG. 7 is a block diagram showing the interconnection of the circuit of FIG. 6 to a binary data signal channel.

FIG. 7 illustrates how stage 30*cc* is used in conjunction with a signal channel 122 which carries the coded signal. In the propagation of the signal through channel 122 it is stored for one bit period in a flip-flop stage 124 (for purposes primarily other than the present invention). The actuation input 34*cc*, 35*cc* is connected to one of the flip-flop output terminals, Q. Gate and threshold circuit 44 is in its OPEN GATE STATE as long as a comma free code signal passes through channel 120. This in turn establishes an AC enable circuit 32. Typically, the AC enable channel 40*cc* is not gated with any other signal; its output being strictly a confidence signal. It is to be appreciated such an output will not discern between different code combinations propagating through channel 120. All it indicates is that there is a logic switching input of predetermined dynamic characteristics. It does not indicate that a code is correct.

Figure 8:
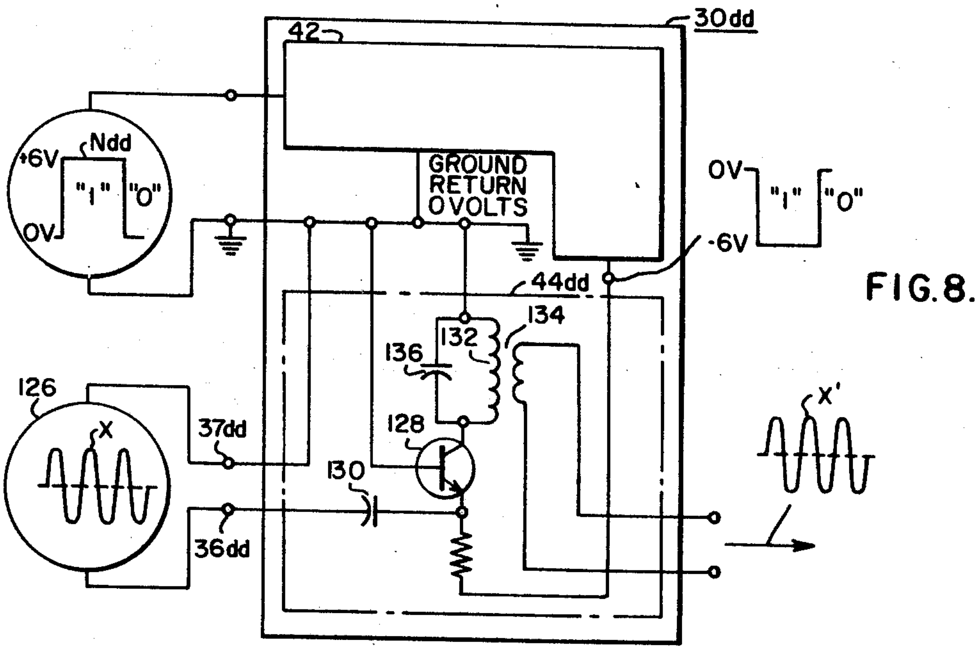
FIG. 8 is another modification of an element in FIG. 1.

Sensor and enable gate stage 30*dd*, FIG. 8 is an alternate form of invention which could be used in place of stages 30, 30*a*...30*d* in FIG. 1. The unidirectional charge path capacitor circuit portion of stage 30*dd* is identical to that of FIG. 1. The signal source 126 connected to the carrier input 36*dd*, 36*dd'* *provides any periodic waveform which can excite a tuned resonant circuit, such as the sinusoidal Wave X depicted in source 126. The gate and threshold circuit 44dd* has an NPN transistor 128 connected in common base configuration as its active device. The signal output from unidirectional charge path capacitor circuit 42 is applied to the emitter to ON-OFF "-power switch" transistor 128. Here the negative potential output state from circuit 42 energized transistor 128 when applied to the emitter. The AC enable signal is applied between the base and the emitter of transistor 128 via a coupling capacitor 130. Transistor 128 drives a tuned resonant circuit consisting of the primary winding 132 of a stepdown transformer 134 and a capacitor 136. The tuned circuit is predetermined to have a resonant frequency equal to the frequency of the AC enable signal input. Attenuation to provide an overall gain of unity is provided by the transformer winding ratio of the stepdown transformer. The tuned circuit has a predetermined "Q" characteristic. The input signal to terminals *36dd*, *37dd* must be of a predetermined amplitude necessary in driving transistor 128 to achieve the power gain needed to excite or "ring" the tuned circuit into resonance. Thus this arrangement of driving transistor with a tuned circuit load of predetermined "Q" characteristics is a thresholding action by a "general" definition of thresholding. This general definition is in contrast to the more restricted definition by which that term is intended to apply only to thresholding by a lower voltage limit cutoff, as in the base-emitter junction thresholding in gate and threshold circuit 44, FIG. 1. Without resonance, the attenuation provided by transformer 134 will attenuate the signal too severely to pass through the following stages. The requirement that the tuned circuit must be excited into resonance by a particular amplitude level in order to transfer the signal from input to output enhances the failsafe properties of this stage in the same way that emitter-base junction thresholding does in stage 30, FIG. 1. The output, Wave X', is a reconstructed version of the sinusoidal input because of the resonant circuit. As such, it will cooperate with any succeeding stages the same as the waveform produced by source 126. A feature of this modification is that the tuned circuit has a greater impedance than any other part of the circuit. As a result any short circuited components will cause the signal to be reduced to an insignificant level. Conversely, an open circuit will either detune the tank circuit or cause total loss of output. The only exception to the above is the possibility of a primary to secondary short in the transformer 134. however, the spacing between windings can be physically separated with sufficient distance that this possibility is negligible, and can be totally discounted in considering the failsafe properties of the circuit. It is to be appreciated that the tuned circuit could be formed by the winding along, making use of its natural self-resonance properties due to inherent equivalent shunt capacitance and other stray capacitances.

Figure 9:
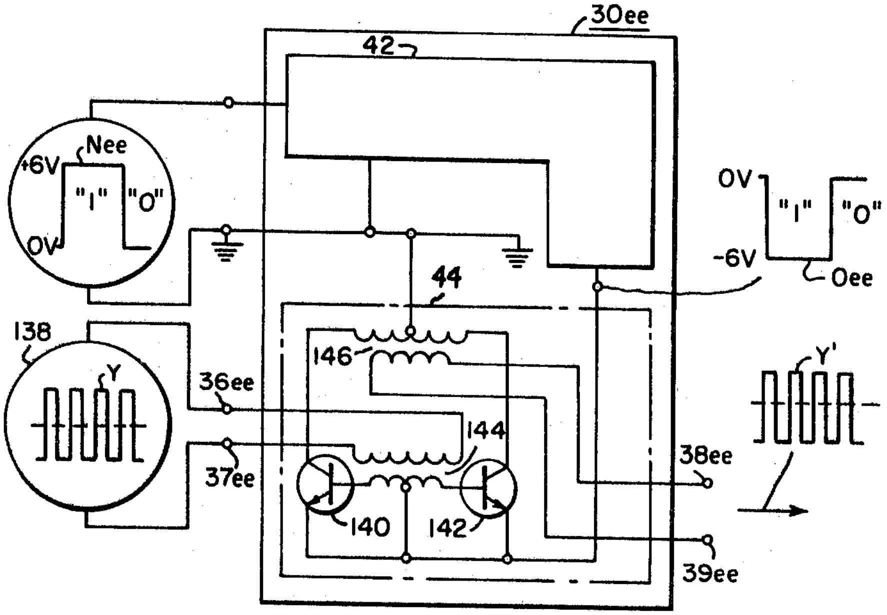
FIG. 9 is still another modification of an element in FIG. 1.

Sensor and enable gate stage **30*ee*, FIG. 9, is another other alternate form of invention which could be used in places of stages 30, 30*a*...30*d* in FIG. 1. Again, the same unidirectional charge path capacitor circuit 42 as in FIG. 1** is used. Here a preferred carrier signal for the AC enable signal input *36ee*, *37ee* is some source 138 providing a symmetric square waveform, Wave Y, as depicted in the source. Under any circumstances the carrier signal should have a symmetrical waveform. The gate and threshold circuit 44 includes a pair of push-pull connected NPN transistors 140 and 142. The negative power signal applied from circuit 42 is coupled to the emitters of the transistors. From the AC enable signal input *36ee*, *37ee* the carrier signal is applied to the primary of a transformer 144. The secondary winding drives the bases of transistors of 140 and 142 in antiphase to each other. Thresholding in this circuit is again provided by the minimum forward conduction voltage of the base-emitter junctions of the transistors. A push-pull output transformer 146 is connected to the collectors of the transistors. The transformer also has a stepdown ratio to provide the attenuation to yield the unity gain. This attenuation is of the order of 10:1. The output signal, Wave Y', from the secondary of transformer 146 is a reconstruction of the carrier signal input for application to a following stage. An important feature of stage *30ee* is that a higher efficiency of transmission of signal is obtained, allowing fan-out, if required. The transistors are used in a common emitter configuration so that the failsafe properties as a result of a high impedance at the output side of the device is obtained without resorting to a tuned circuit. The worst failure condition of short circuit, i.e. base to collector on each transistor with loss of emitter connections, would cause the input signal to appear directly across the primary of the output transformer. However, because of the significant stepdown ratio the small output signal form the stage would be incapable of exceeding the threshold of the next stage.

Figure 10:
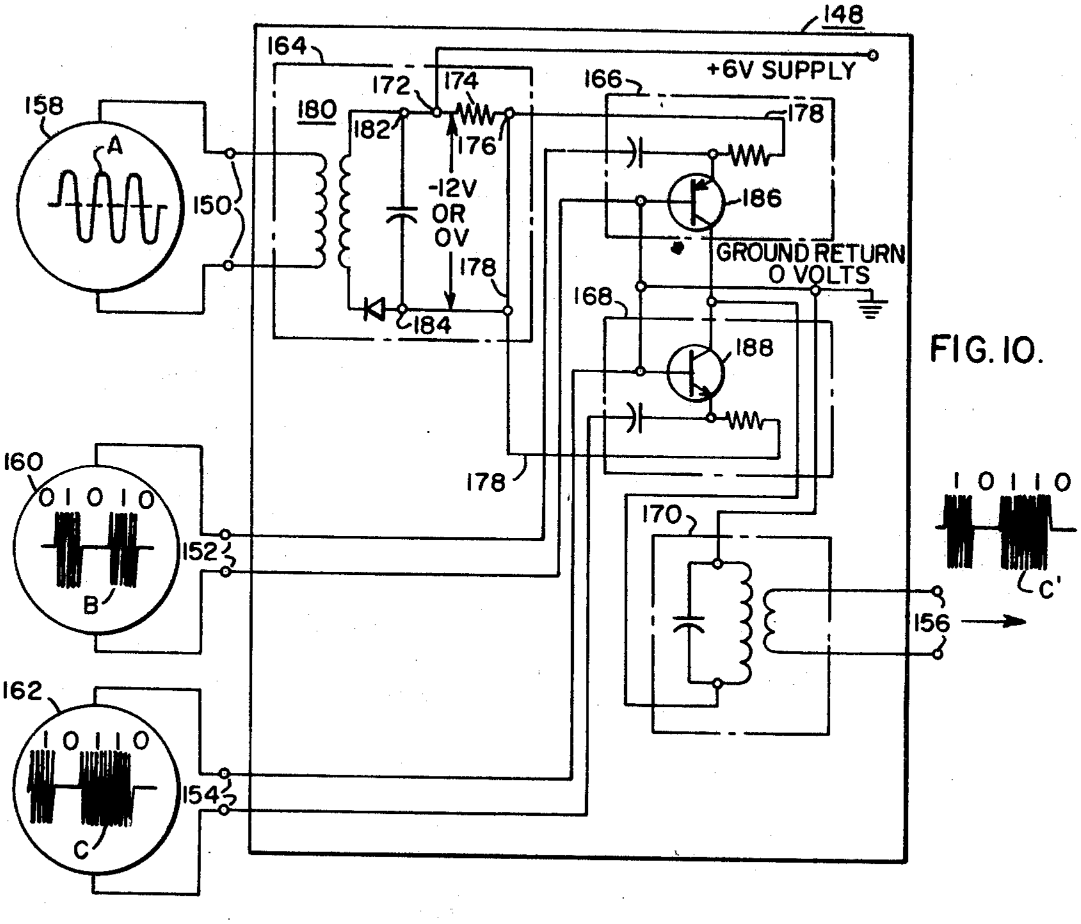
FIG. 10 is an alternate form of invention which functions as an interlocking relay which controls the gating of two signal channels in accordance with predetermined logical interlocking functions.

FIG. 10 shows an alternate form of invention consisting of an electronic relay circuit 148 which operates in the fashion of a mechanical single-pole, double-throw, railway vital relay. These mechanical relays employ a gravity drop mode of operation with one of the armature positions a restricted position, in which the restricted input is mechanically connected to the output against force of gravity. Absence or failure of actuation results in the gravity drop of the armature to a position which connects the nonrestricted input to the output. Relay circuit 148 has an actuation input 150, a pair of independent AC enable circuit inputs consisting of a nonrestricted input 152 and a restricted input 154 and an AC enable circuit output 156.

The signal source 158 connected to actuation input represents the signal output from a speed block in the system disclosed in the copending application of G.M. Thorne-Booth entitled "Signalling System For Determining The Presence Of A Train Vehicle, " filed Aug. 23, 1967, Ser. No. 662,711. Source 158 provides an AF tone signal, signal A, when a speed block is unoccupied. The waveform of signal A is depicted in source 158. Signal A is absent when the speed block is occupied by a train. The signal source 160 connected to nonrestricted circuit input 152 is a pulse coded AF tone signal representing a code component for an 18 m.p.h. speed command, signal B, (depicted in the source). The presence of this signal at enable circuit output 156 is deemed a "safe" output mode. The source 162 connected to restricted enable circuit input 154 is a signal channel containing a pulse coded AF tone representing a code component for an 80 m.p.h. speed command signal C. Presence of this signal at the enable circuit output 156 is deemed the output mode which is "not safe" without the presence of a signal A. Hence it should not be present under any conceivable failure mode. Signal C is depicted in the source 162. Both signals B and C have a common predetermined tone frequency. Electronic relay 148 is part of the code generating system for generating the previously described comma free speed control codes.

The main parts of electronic relay circuit 148 comprise a unidirectional charge path capacitor circuit 164, a signal B gate circuit 166, a signal C gate circuit 168, and tuned load circuit 170. In unidirectional charge path capacitor circuit 164, a +6-volt supply is connected to one terminal 172 of a limiting resistor 174. Connected to the other terminal 176 is a transistor power busline 178. Unidirectional charge path capacitor circuit comprises a simple rectifier circuit 180 to which actuation input 150 is connected. The rectifier has a negative output terminal 182 connected to the other terminal 176 of resistor 174. The circuit parameters of the rectifier network 180 are so chosen that presence of signal A provides a 12-volt DC output of a polarity with terminal 184 negative relative to terminal 182. Thus, the output of the rectifier "-bucks" the 6-volt supply and causes transistor power busline 178 to be at a −6-volt state when signal A is present.

Signal B gate circuit 166 is like gate and threshold circuit *44dd*, FIG. 8 without its tuned collector load circuit. Another difference is that gate circuit 166 has a PNP transistor 186 rather than a NPN transistor. The transistor is power switched by application of the busline 178 to the emitter. Similarly, the signal C gate circuit 168 is without a load circuit and has a NPN transistor 188. The busline 178 is applied to its emitter.

Tuned load circuit 170 is tuned to the predetermined frequency of signals B and C and forms a common load circuit which is shared by both gate circuits 166 and 168.

Electronic relay circuit 148 operates as follows. Presence of signal A at actuation input 150 causes busline 178 to be at its −6-volt state which causes the transistor 188 of gate circuit 168 to be energized, but transistor 186 of circuit 166 to be not energized. This will cause signal C′, which is a reconstruction of signal C, to appear at the output as depicted on the drawing. Absence of signal A will cause loss of the bucking voltage from rectifier 180 so that signal B gate circuit 166 is energized, but not signal C gate circuit 168. This will cause signal B to appear to enable circuit output 156. Thus, either signal B or signal C will be transmitted through circuit 148, never both and never signal C if the actuating signal A is not present. It will be appreciated that the single-pole, double-throw function is achieved by exploitation of complementary transistors driven from a single supply point. This is a fundamental assurance that completely precludes both transistors being simultaneously energized.

Figure 11:
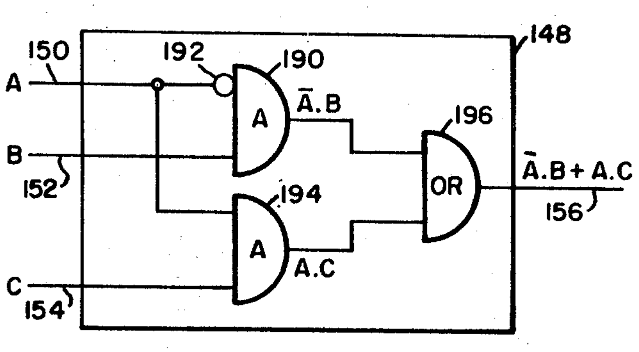
FIG. 11 is a diagrammatic showing of the Boolean Algebra logic functions implemented by the circuit of FIG. 10.

FIG. 11 diagrammatically depicts the logic function performed by relay circuit 148, using logic gate notations and symbols. It comprises an AND gate 190 having a NOT circuit 192 at one of its two inputs, and an AND gate 194 having two inputs. The outputs of gates 190 and 194 are applied to two inputs of an OR gate 196. Actuation input 150 is effectively coupled to the NOT circuit 192 at one input of AND gate 190 and to one of the inputs of AND gate 194. Nonrestricted enable circuit input 152 is effectively connected to the other input of AND gate 190. THe restricted enable circuit input 154 is effectively connected to the other input of AND gate 194. The enable circuit output 156 is effectively the output from OR gate 196. A signal representing the logical state $\bar{A}.B$ (absence of signal A and presence of signal B) and a signal representing the logical state A.C (presence of signal A. and presence of signal C) yielding the output logic function $\bar{A}.B + A.C$. This corresponds to the logic performed by a so-called "exclusive OR gate" network. It is to be noted that the logical state A.C. which is the "not safe" output mode, is derived by operation of unidirectional charge path circuit 164 and, signal C gate circuit 168, and tuned load circuit 170. It is to be appreciated that the operation of this combination is the same as that unidirectional charge path capacitor circuit 42*bb*, FIG. 5 and gate and threshold circuit 44*dd*, FIG. 8, and therefore has the same failsafe properties in passing this "not safe" output mode to output 156.

Although gate circuits 166 and 168 and tuned load circuit 170 have been illustrated by a constructionlike gate and threshold circuit 44*dd*, FIG. 8, it could alternatively be constructed following the principles of circuit 44, FIG. 1. In the latter case the common load circuit would contain the transformer with a primary winding having self-resonant characteristics cooperating with the nonsymmetric pulse wave carrier signal. The latter carrier signal would be pulse modulated in accordance with the speed code components.

It will be appreciated that in addition to heretofore mentioned advantages, another advantage of the invention is that the circuits disclosed herein can be built inexpensively using solid-state devices which have a high degree of immunity from conditions which could cause catastrophic failure of any electromechanical component, e.g., frozen relay contacts, ingress of dust or mud.

While the present invention has been described with a degree of particularity it should be understood that various modifications and changes thereof will be readily apparent and can be made within the scope and spirit of the present invention.

I claim:

1. An exclusive OR type logical gate switch network having two dynamic signal gate channels comprising a restrictive channel and a nonrestrictive channel, said gate switch network being actuable to an OPEN GATE condition of the restrictive gate channel in response to a predetermined signal state of a gate actuation signal, said predetermined signal state including presence of a predetermined dynamic signal state of the gate actuation signal, said logical gate switch network being in an OPEN GATE condition of the nonrestrictive gate channel in absence of the predetermined signal state of the gate actuation signal, said logical gate switch network comprising;

a nonrestrictive gate channel switch means including an active amplification device which is energizable to an OPEN GATE condition in which it passes a dynamic signal in response to a power-switching DC signal of a first of opposite polarities, a restrictive gate channel switch means including an active amplification device which is energizable to an OPEN GATE condition in which it passes a dynamic signal in response to a power-switching DC signal of a second of opposite polarities, a common active amplification device power supply busline operatively connected to both the nonrestrictive and the restrictive gate channel switch means, a continuous signal source means for applying a first power-switching DC signal of said first polarity and of a first predetermined magnitude to the power supply busline, and a unidirectional charge path capacitor circuit means for receiving said gate actuation signal and when said predetermined signal state of the gate actuation signal is present said unidirectional charge path capacitor circuit means being operative to apply a second DC signal of the second polarity and of a magnitude greater than said first predetermined magnitude to the common busline in bucking relationship to the first DC signal to energize the restrictive gate channel switching means.

2. A gate switch network in accordance with claim 1 for use with a gate actuation signal wherein the predetermined signal state comprises a signal wave alternating about a signal ground, with;

said unidirectional charge path capacitor circuit means being a rectifier circuit.

3. Signal switching apparatus comprising:

switch means responsive to a switching signal applied to a first input for permitting an input signal applied to a second input to provide an output signal;

signal means for providing a first signal having first and second signal states;

means operative with said switch means and said signal means for applying said switching signal to said first input of said switch means in response to said first signal being in said first state for less than a predetermined time duration and for removing said switching signal from said first input of said switch means in response to one of said first signal being in said second signal state and said first signal state for a time duration greater than said predetermined time duration.

4. Signal switching apparatus comprising:

switch means responsive to a first signal applied to a first input and a second signal applied to a second input, with second signal enabling said switch means to provide an output signal indication upon the occurrence of said first signal;

signal means for providing a third signal comprising a first signal state, having at least a predetermined time duration, and a second signal state;

means operative with said switch means and said signal means for applying said second signal to the second input of said switch means in response to said third signal being in said first signal state for enabling said switch means, and for removing said second signal from the second input of said switch means in response to said third signal being in one of said second signal state or said first signal state for a time duration longer than said predetermined time duration, for disabling said switch means.

5. Signal switching apparatus comprising:

switch means responsive to a switching signal applied to a first input for permitting an input signal applied to a second input to provide an output signal;

signal means for producing a first signal coded to have a predetermined frequency; and means operative with said switch means and said signal means for applying said switching signal to said first input of said switch in response to said first signal being produced by said signal means and for removing said switching signal from said first input of said switch in response to one of said signal means no longer producing said first signal or said signal means producing another signal having a frequency different than said first signal.

6. Signal gating apparatus comprising:

a switch responsive to a control signal applied to a control input for permitting an input signal to provide an output signal;

signal means for providing a periodic signal of period T, which traverses between first and second levels; and means operative with said switch and said signal means for applying said control signal to said control input of said switch in response to said first level of said periodic signal during each period T, and for removing said control signal from said control input of said switch in response to one of said second level of said periodic signal during each period T and said first level for a predetermined interval of time which is longer in duration than said period T.

7. A failsafe circuit for gating a dynamic carrier signal, said circuit being actuable to provide an OPEN GATE condition in response to a predetermined signal state of a gate actuation signal, said circuit comprising:

an active amplifying device having a first control electrode and second and third operating potential electrodes, said amplifying device being operative only during application of a predetermined operating potential across the second and third electrodes, a first input network for receiving said gate actuation signal, said first input network including a first circuit means responsive to presence of the predetermined signal state to produce the predetermined operating potential and for applying same across the second and third electrodes, a second input network for receiving the dynamic carrier signal and coupling same to said first electrode of the amplifying device, said second input network including a DC blocking means, and a dynamic carrier signal output network operatively connected in a current circuit path through said second and third electrodes, said output network including a stepdown transformer, said stepdown transformer cooperating with the gain of the active amplification device to provide a predetermined signal attenuation to yield a net gate circuit signal gain substantially equal to unity.

8. A gate circuit in accordance with claim 7, for use in gating a dynamic carrier signal having a waveform consisting of a periodically repeated pulse signal with a predetermined pulse width, with;

said active amplification device being a transistor with the output network operatively connected in a current circuit path through the emitter and collector electrodes, said second input network including a second circuit means operative to ON-BIAS the transistor between pulses and to CUT-OFF the transistor during presence of a pulse, the primary winding of the stepdown transformer being adapted to exhibit self-ring properties coincident with the CUT-OFF pulse.

9. A gate circuit in accordance with claim 7, for use in gating a periodically varying dynamic carrier signal having a predetermined frequency, with;

said output network including a parallel tuned circuit having a resonant frequency equal to said predetermined frequency, said parallel tuned circuit comprising the primary of said stepdown transformer and a capacitor means operatively associated with the primary winding in shunt relationship thereacross.

10. A failsafe circuit for gating a dynamic carrier signal, said circuit being actuable to provide an OPEN GATE condition in response to a predetermined signal state of a periodic gate actuation signal of period T, said circuit comprising:

an active amplifying device having a first control electrode and second and third operating potential electrodes, said amplifying device being operative only during application of a predetermined operating potential across the second and third electrodes;

a first input network for receiving said gate actuation signal, said first input network including a first circuit means responsive to presence of the predetermined signal state during each said period T to produce the predetermined operating potential and for applying same across the second and third electrodes, said first input network including means responsive to the presence of the predetermined signal state for a predetermined interval of time, which is greater than said period T, for removing the predetermined operating potential from across the second and third electrodes;

a second input network for receiving the dynamic carrier signal and coupling same to said first electrode of the amplifying device, said second input network including a DC blocking means; and a dynamic carrier signal output network operatively connected in a current circuit path through said second and third electrodes, said output network including a passive attenuation and DC blocking means, said attenuation and DC blocking means cooperating with the gain of the active amplification device to provide a predetermined signal attenuation to yield a net gate circuit signal gain substantially equal to unity.

11. A gate circuit in accordance with claim 10, wherein said predetermined signal state of the gate actuation signal includes presence of a predetermined dynamic signal state; with said first input network comprising a unidirectional charge path capacitor circuit means operative to charge a storage capacitor when a gate actuation signal having said predetermined dynamic signal state is applied thereto, said storage capacitor being operative as the source of the predetermined operating potential.

12. A gate circuit in accordance with claim 1, with; means for blocking propagation of a received dynamic carrier signal through the circuit unless it exceeds a predetermined minimum signal level.

13. A gate circuit in accordance with claim 12, for use in gating a periodically varying dynamic carrier signal having a predetermined frequency, with;

said dynamic carrier signal output network including a parallel tuned circuit having a resonant frequency equal to said predetermined frequency.

14. A gate circuit in accordance with claim 12, with;

said active amplification device being a transistor with said second input network in coupling relationship to its base, said means for blocking propagation including a third circuit means operative to allow the dynamic carrier signal to pass only if same exceeds the minimum forward conducting voltage across the base-emitter junction of the transistor.

15. A gate circuit in accordance with claim 14, for use in gating a dynamic carrier signal having a waveform comprising a periodically repeated pulse signal with a predetermined pulse width, with;

said third circuit means comprising an ON-BIAS capacitor having an input terminal and having another terminal, said another terminal being connected to signal ground through a unidirectional current device to level shift the input waveform to provide a shifted waveform at the base, said shifted waveform having the portion of the wave between pulses of a sufficient amplitude level, to exceed said minimum forward conducting voltage.